United States Patent [19]
Schievelbein

[11] Patent Number: 4,460,481
[45] Date of Patent: Jul. 17, 1984

[54] SURFACTANT WATERFLOODING ENHANCED OIL RECOVERY PROCESS

[75] Inventor: Vernon H. Schievelbein, Houston, Tex.

[73] Assignee: Texaco Inc., White Plains, N.Y.

[21] Appl. No.: 318,549

[22] Filed: Nov. 5, 1981

Related U.S. Application Data

[63] Continuation-in-part of Ser. No. 191,586, Sep. 29, 1980, abandoned, which is a continuation-in-part of Ser. No. 92,900, Nov. 9, 1979, abandoned.

[51] Int. Cl.³ .............................................. E21B 43/22
[52] U.S. Cl. ............................... 253/8.55 D; 166/273; 166/274; 166/275
[58] Field of Search ................... 252/8.55 D; 166/273, 166/274, 275

[56] References Cited
U.S. PATENT DOCUMENTS

| | | | |
|---|---|---|---|
| 3,508,612 | 4/1970 | Reisberg et al. | 166/274 |
| 3,827,497 | 8/1974 | Dycus et al. | 166/274 |
| 3,977,471 | 8/1976 | Gale et al. | 252/8.55 X |
| 4,018,278 | 4/1977 | Shupe | 166/274 |
| 4,066,124 | 1/1978 | Carlin et al. | 166/273 |
| 4,088,189 | 5/1978 | Shupe | 166/272 |

Primary Examiner—Herbert B. Guynn
Attorney, Agent, or Firm—Carl G. Ries; Jack H. Park

[57] ABSTRACT

Disclosed is a surfactant waterflooding enhanced oil recovery process and surfactant fluid suitable for use in an enhanced oil recovery process which accomplishes an increase in the amount of oil recovered over prior art methods. The surfactant fluid contains an alkylpolyalkoxy sulfate or alkylarylpolyalkoxy sulfate, or an alkylpolyalkoxyalkylene sulfonate or alkylarylpolyalkoxyalkylene sulfonate, either alone or in combination with an organic sulfonate anionic surfactant, such as petroleum sulfonate. The optimum average degree of ethoxylation of the alkoxy sulfate or alkoxy sulfonate surfactant is identified, and the surfactant fluid is formulated with a mixture of ethoxylated and sulfated or ethoxylated and sulfonated surfactants, having a broad even range of degree of ethoxylation.

15 Claims, No Drawings

SURFACTANT WATERFLOODING ENHANCED OIL RECOVERY PROCESS

CROSS REFERENCE TO RELATED APPLICATION

This application is a continuation-in-part of copending application Ser. No. 191,586 filed Sept. 29, 1980 for "Surfactant Waterflood Enhanced Oil Recovery Process" which was a continuation-in-part of application Ser. No. 92,900 filed Nov. 9, 1979 for "Surfactant Waterflooding Oil Recovery Process," both now abandoned.

FIELD OF THE INVENTION

This invention pertains to a process for enhanced oil recovery, and more particularly it pertains to an improved surfactant waterflooding enhanced oil recovery process for use in high salinity water-containing formations.

BACKGROUND OF THE INVENTION

It is well recognized by persons skilled in the art of oil recovery techniques that only a fraction of the amount of petroleum or oil originally present in the petroleum reservoir is recovered by primary recovery methods, e.g. by pumping or allowing the oil to flow to the surface of the earth as a consequence of naturally-occurring energy forces, or even by use of so-called secondary recovery techniques which comprise injecting water into the formation by one or more wells to displace petroleum toward one or more spaced-apart production wells from which it is recovered to the surface of the earth. Although water-flooding is an inexpensive enhanced oil recovery process, water does not displace oil effectively even in those portions of the formation through which it passes, bacause water and oil are immiscible and the interfacial tension between water and oil is quite high. This too has been recognized by persons skilled in the art of enhanced oil recovery, and many surface active agents or surfactants have been proposed for incorporating in the flood water for the purpose of reducing the interfacial tension between the injected aqueous fluid and the formation petroleum, thereby recovering substantially more of the petroleum present in the portions of the formation through which the injected aqueous fluid passes than is possible for a simple water-flood alone. Petroleum sulfonates have been disclosed for this purpose in many references although such use is limited to surfactant waterflooding processes applied to formations containing relatively low salinity water, e.g. formations containing water whose salinity is less than 20,000 parts per million total dissolved solids, unless a solubilizing co-surfactant is mixed with petroleum sulfonate.

It is also recognized that other types of surfactants may be used alone or in combination with petroleum sulfonate in high salinity environments. Alkylpolyethoxy sulfates or alkylarylpolyethoxy sulfates may be used in high salinity water-containing formations so long as the temperature is less than about 120° F. (49° C.), but should not be used in higher temperature formations because of the propensity for the ethoxylated and sulfated surfactants to hydrolyze. It is also known in the art to employ, either alone or in combination with petroleum sulfonate, an alkylpolyethoxyalkylene sulfonate or alkylarylpolyethoxyalkylene sulfonate, which surfactant is tolerant of very high salinities and stable at temperatures considerably higher than the ethoxylated and sulfated surfactants.

Despite the existance of a substantial amount of prior art describing the use of surfactant waterflooding oil recovery processes, little commercial use has been of surfactant waterflooding processes because the amount of additional oil recovered thereby has so far been insufficient to offset the high cost of surfactants employed in the processes.

In view of the foregoing discussion, and also in view of the current serious shortage of petroleum, it can be appreciated that there is a significant need for an economical surfactant waterflooding oil recovery process which will produce additional amounts of oil over that obtainable by waterflooding and known surfactant waterflooding oil recovery processes.

PRIOR ART

U.S. Pat. No. 4,165,785 describes an oil recovery process employing an alkylpolyalkoxyalkylene sulfonate or alkylarylpolyalkoxyalkylene sulfonate, in which two surfactant-containing slugs are injected, the first injected slug containing a surfactant which forms an emulsion with the formation petroleum, and a second, subsequently-injected slug which contains a surfactant which produces essentially no emulsion but which reduces the interfacial tension. The surfactants employed in the two slugs differ from one another only in a slight difference in the number of ethoxy groups contained therein.

U.S. Pat. Nos. 4,066,124 and 4,110,228 teach methods for selecting the optimum ethoxylated and sulfonated or ethoxylated and sulfated surfactant for use in combination with petroleum sulfonate, and selecting the optimum ratio of solubilizing co-surfactants to primary anionic organic sulfonate surfactant.

U.S. Pat. No. 4,018,278 teaches employing an ethoxylated and sulfonated surfactant in single surfactant form. U.S. Pat. Nos. 3,827,497 and 3,977,471 teach an oil recovery process employing an ethoxylated and sulfonated surfactant alone or in combination with a petroleum sulfonate. U.S. Pat. No. 3,508,612 teaches an oil recovery process employing an ethoxylated and sulfated surfactant in combination with petroleum sulfonate.

U.S. Pat. No. 4,088,189 describes methods for identifying the optimum average degree of ethoxylation in an ethoxylated and sulfonated surfactant for a particular field environment.

SUMMARY OF THE INVENTION

I have discovered an improved surfactant waterflooding enhanced oil recovery process by means of which the amount of oil recoverable from a subterranean oil-containing formation is improved without causing a significant increase in the cost of the surfactant-containing fluid. The surfactant fluid contains at least one synthetic surfactant which is soluble in relatively high salinity aqueous fluids and which is effective for low surface tension displacement of oil in such an environment. The surfactant is ethoxylated and sulfated or ethoxylated and sulfonated, and may be employed alone as substantially the only surfactant used in the surfactant-containing fluid or it may be employed in combination with one or more other types of surfactants, usually at least one of which is an organic sulfonate such as petroleum sulfonate.

The ethoxylated and sulfonated surfactant employed in my process has the following formula:

$$RO(R'O)_xR''SO_3^-X^+$$

wherein R is a $C_6$ to $C_{24}$ and preferably $C_9$ to $C_{20}$ alkyl, or an alkylaryl such as benzene, toluene or xylene having attached thereto at least one $C_6$ to $C_{20}$ and preferably $C_9$ to $C_{15}$ alkyl group, R' is ethylene or a mixture of ethylene and propylene or other higher alkylene with relatively more ethylene than higher alkylene, x is a number representing the average number of alkylene oxide units, R" is ethylene, propylene, hydroxy propylene or butylene, S is sulfur, O is oxygen, and X is a monovalent cation, preferably sodium, potassium, lithium or ammonium.

The other surfactant which may be employed in the process of my invention is a sulfated and ethoxylated surfactant having the following formula:

$$RO(R'O)_xSO_3^-X^+$$

where R, R', x, S, O and X have the same meaning as above.

The value of x (which may be a whole or fractional number) which achieves optimum oil recovery effectiveness in a fluid whose salinity is about equal to the salinity of the water present in the formation into which the surfactant fluid is to be injected is identified by methods well known in the art. The integer n which is closest to x numerically is identified. (e.g. if $x=3.1$ to 3.4, $n=3$. If $x=3.6$ to 3.9, $n=4$. If $x=3.5$, $n=4$, etc.)

In using either the sulfated and ethoxylated or sulfonated and ethoxylated surfactant, the surfactant employed is comprised of a mixture of molecular species differing in the degree of ethoxylation and containing species having degree of ethoxylation ranging from $n-2$ or less to $n+10$ and preferably from $n-2$ to $n+4$. From 14 to 20 and preferably 15 to 19 percent of the surfactant molecules have degrees of ethoxylation less than $n-1$; from 16 to 25 and preferably 16 to 24 percent have degrees of ethoxylation equal to $n-1$; from 16 to 25 and preferably 18 to 24 percent of the molecules have degrees of ethoxylation equal to n; from 12 to 17 and preferably from 14 to 16 percent have degrees of ethoxylation equal to $n+1$; and from 15 to 25 and preferably 18 to 24 percent have degrees of ethoxylation greater than $n+1$. All percentage ranges given above refer to weight percent.

In employing the fluid containing either of the above described surfactants, the surfactant fluid contains from 0.1 to 10.0 and preferably 0.5 to 5.0 percent by weight of the ethoxylated and sulfonated or ethoxylated and sulfated surfactant. If said surfactant is used in combination with an organic sulfonate, preferably petroleum sulfonate, the concentration of the organic sulfonate is from 1.0 to 15.0 and preferably 2.0 to 10.0 percent by weight. In this application, the composition of the surfactant fluid need not change with time as the fluid is injected into the formation, i.e. the broad range of ethoxylation applies to all of the surfactant fluid injected into the formation. Thus, the mixing equipment and procedure required to formulate the fluid with the critical broad range of ethoxylation is constant throughout the course of formulating and injecting the surfactant fluid into the formation.

DESCRIPTION OF THE PREFERRED EMBODIMENTS

Briefly, the process of my invention is an improvement in a surfactant waterflooding enhanced oil recovery process. In its simplest form, the process of my invention comprises injecting an aqueous fluid containing a surfactant which is ethoxylated and sulfated or ethoxylated and sulfonated, which surfactant is very tolerant of high salinity and/or hard water frequently encountered in subterranean petroleum-containing formations. The surfactant-containing fluid is injected into the formation, passes through the formation and displaces oil remaining therein even after conclusion of a waterflood oil recovery process, which oil is recovered from the formation by a production well spaced-apart from the well employed for injecting the surfactant fluid.

The surfactant which will in all embodiments, be present in the fluid employed in the oil recovery process of my invention is one having one of the two following formulas:

$$RO(R'O)_xR''SO_3^-X^+ \text{ (alkoxy sulfonate)} \qquad I$$

wherein R is a $C_6$ to $C_{24}$ and preferably $C_9$ to $C_{20}$ alkyl, or an alkylaryl such as benzene, toluene or xylene having attached thereto at least one $C_6$ to $C_{20}$ and preferably $C_9$ to $C_{15}$ alkyl group, R' is ethylene or a mixture of ethylene and propylene or other higher alkylene with relatively more ethylene than propylene or other higher alkylene, x is a number representing the average number of alkylene oxide units, R" is ethylene, propylene, hydroxy propylene or butylene, S is sulfur, O is oxygen, and X is a monovalent cation, preferably sodium, potassium, lithium or ammonium.

$$RO(R'O)_xSO_3X \text{ (alkoxy sulfate)} \qquad II$$

where R, O, R', x, S and X have the same meaning as in formula I above.

The value of x (which may be a whole or fractional number) which achieves optimum oil recovery effectiveness in a fluid whose salinity is about equal to the salinity of the water present in the formation into which the surfactant fluid is to be injected is identified by methods well known in the art. The integer n which is closest to x numerically is identified. (e.g. if $x=3.1$ to 3.4, $n=3$. If $x=3.6$ to 3.9, $n=4$. If $x=3.5$, $n=4$).

In either of the above-described surfactants, the value of n is identified as described above, and the surfactant is then formulated of a mixture of molecular species differing in degree of alkoxylation and containing species having degrees of alkoxylation ranging from $n-2$ or less to $n+10$ and preferably from $n-2$ to $n+4$. From 14 to 20 and preferably 15 to 19 percent of the surfactant molecules have degrees of alkoxylation less than $n-1$; from 16 to 25 and preferably 18 to 24 percent have degrees of alkoxylation equal to $n-1$; from 16 to 25 and preferably 18 to 24 percent of the molecules have degrees of alkoxylation equal to n; from 12 to 17 and preferably from 12 to 16 have degrees of alkoxylation equal to $n+1$; and from 15 to 25 and preferably 18 to 24 percent have degrees of ethoxylation greater than $n+1$. The above described broad, even range of degree of alkoxylation cannot be produced in a single reaction mixture. Even though reacting a given number of moles of ethylene oxide with a mole of alcohol or alkylphenol will produce an ethoxylated alcohol or phenol having a mixture of molecules differing in the degree of ethoxylation, which can be used to produce an ethoxy sulfonate or ethoxy sulfate having a similarly limited range in degree of ethoxylation, the range in degree of ethoxylation will not be of sufficient breadth or evenness to produce the superior results obtained from use of a surfactant mixture formulated to contain the broad, even distribution of molecular species according to my invention. For example, if four moles of ethylene oxide are reacted with one mole of nonylphenol and the ethoxylated phenol is sulfated, the ethoxy sulfate will contain molecular species having three or less, four and five or more ethoxy groups, but neither the breadth nor distribution will be sufficient to produce the superior results attainable using an ethoxy sulfate whose degree of ethoxylation conforms to the above criteria. The desired broad, even range is attained only if two or more products are produced, such as sulfated reaction products produced by sulfation of three and five mole ethylene oxide adducts of nonylphenol, and then the two ethoxy sulfates are blended to produce an ethoxy sulfate of desired broad, even degree of ethoxylation.

In the above formula I the surfactant is an alkylpolyalkoxy sulfonate or alkylarylpolyalkoxy sulfonate surfactant. The surfactant or formula II is an alkyl polyalkoxyalkylene sulfate or alkylarylpolyalkoxyalkylene sulfate surfactant. The ethoxylated and sulfated surfactants are very effective in high salinity environments, e.g. from a salinity of 20,000 parts per million total dissolved solids up to 240,000 parts per million total dissolved solids, but should only be used in formations whose temperatures are less than about 120° F. (49° C.), because these surfactants are pone to hydrolyze at a rate which increases with increased temperature. At temperatures less than 120° F., the rate of hydrolysis is so slow that no problems are encountered within the time that the surfactant fluid is normally present in the formation, and so the ethoxy sulfates may be used effectively. These are the surfactants of choice in environments where the temperature permits their use, since they are more readily available and less expensive than the ethoxylated and sulfonated surfactants. When the formation temperature exceeds about 120° F., the surfactant of choice is one which is ethoxylated and sulfonated, e.g. an alkylpolyalkoxyalkylene sulfonate or alkylarylpolyalkoxyalkylene sulfonate.

Whether the surfactant employed is an ethoxy sulfate or ethoxy sulfonate, the essential characteristic which I have found to produce superior results, pertains to the critical broad, even range of alkoxylation of the surfactant.

The commonest alkoxy group used in preparing surfactants used in my process is ethoxy and reference is frequently made below to ethoxylated surfactants for this reason; however, this should be understood to include mixtures of ethoxy and higher alkoxy units as described more fully above. Many references teach methods for identifying the optimum average degree of ethoxylation such as by direct measurement of oil recovery effectiveness at salinities equivalent to those which will be encountered in the subterranean formation, preferably at temperatures comparable to the formation temperature. Other methods include determining the degree of ethoxylation which produces minimum interfacial tension in an environment equivalent to the formation conditions. Other prior art techniques may also be employed, but all of these references relate to methods for choosing the optimum average degree of ethoxylation of the ethoxylated and sulfated or ethoxylated and sulfonated surfactant. Such references contemplate that a single species or mixture of species comprising a limited degree of ethoxylation, blended to produce the identified optimum average degree of ethoxylation, will be employed. For example, if the tests conducted according to the prior teachings indicates that the surfactant employed in the oil recovery process should contain an average of 3.5 moles of ethylene oxide per mole of surfactant, the prior art methods teach that either a sulfated or sulfonated, 3.5 mole ethylene oxide adduct of alcohol or phenol, or at most a mixture comprising approximately equal amounts of two surfactants, one having an average of 3.0 moles of ethylene oxide and one containing an average of 4.0 moles of ethylene oxide per mole of surfactant should be used. None of the references recognized the advantage of blending more than these two surfactants e.g. including surfactants which are prepared by reacting less than 3.0 moles of ethylene oxide per mole of surfactant, and one which is prepared by reacting more than 4.0 moles of ethylene oxide per mole of surfactant, as is necessary to produce a mixture which meets the criteria of my invention.

In identifying the particular surfactant or surfactants as well as the ratio of surfactants in the embodiment involving a combination of surfactants, it is necessary that the surfactant which reduces the interfacial tension between petroleum and the aqueous phase to a value less than 100 and preferably less than 20 millidynes per centimeter should be identified. Factors which affect the ability of the surfactant to reduce the interfacial tension to these levels include the average degree of ethoxylation, the chain length of the alkyl or alkylaryl group (R in the above formula) and in the embodiment employing a plurality of surfactants, and the ratio of the ethoxylated and sulfated or ethoxylated and sulfonated surfactant to the other surfactants.

I have found that superior oil recovery results are obtained if the ethoxylated and sulfated or ethoxylated and sulfonated surfactant is comprised of a mixture of a number of species, as is defined precisely herein, exhibiting a broad, even spectrum of molecules of different degrees of ethoxylation.

In formulating the surfactant fluid, the techniques and concentrations commonly employed in state of the art surfactant waterflooding processes are utilized. The concentration of the ethoxylated and sulfonated or ethoxylated and sulfated surfactant is ordinarily in the range of from 0.1 to 10.0 and preferably 0.5 to 5.0 percent by weight when this surfactant is employed as essentially the only surfactant present in the surfactant fluid. When the surfactant fluid comprises a mixture of two or more surfactants, the concentration of ethoxylated and sulfated or ethoxylated and sulfonated surfactant should be from 0.2 to 8.0 and preferably 0.4 to 4.0 percent by weight. When the other surfactant present in the fluid is an organic sulfonate, preferably a petroleum sulfonate having an average equivalent weight in the range of from 350 to 450, the concentration of organic sulfonate is from 1.0 to 15.0 and preferably 2.0 to 10.0 percent by weight. As is taught in the prior art, the phase stability of this fluid is sometimes improved if another component is present, which is a low HLB, relatively water insoluble nonionic surfactant. Specifically, incorporation of from 0.1 to 10.0 percent by weight of a water insoluble nonionic surfactant, e.g. an ethoxylated alkanol or ethoxylated alkylphenol, improves the phase stability of the surfactant fluid. Specifically, ethoxylated alkanols or alkylphenols having from 2 to 8 moles of ethylene oxide per mole of alkanol or phenol, are effective for stabilizing the surfactant fluid.

The surfactants are dissolved in the aqueous fluid and, as is taught in the prior art, the injectivity of the fluid may be improved by shearing the surfactant fluid sufficiently to reduce turbidity thereof prior to injecting it into the formation, as is done with other surfactant fluids utilizing this type of surfactant in state-of-the-art surfactant waterflooding oil recovery processes.

The volume of surfactant fluid employed is generally in the range from 0.01 to 1.0 and preferably from 0.05 to 0.4 pore volumes based on the pore volume of the portion of the formation to be contacted by the surfactant fluid.

The surfactant fluid may also contain other additives commonly employed in surfactant waterflooding, specifically substances which reduce surfactant adsorption, such as lignosulfonates or chemically modified lignosulfonates, as well as additives which increase the viscosity of the fluid for improved sweep efficiency, such as hydrophilic polymers including partially hydrolyzed polyacrylamide, co-polymers of acrylamide and acrylates, as well as polysaccharides. Similary, a separate fluid containing the above-described hydrophilic polymers may be injected subsequent to injecting the surfactant fluid, to displace the fluid through the formation, providing improved mobility ratio between the injected and displacing fluids. Finally, field brine is ordinarily injected to displace all of the previously injected fluids through the formation, until all of the oil which has been displaced and banked by the surfactant fluid has been recovered from the formation.

EXPERIMENTAL RESULTS

A series of sulfonated and ethoxylated surfactants were prepared for testing the effectiveness of the process of my invention for recovering oil under controlled laboratory conditions. All of the surfactants were synthesized from a dodecyl phenol by reacting dodecyl phenol with varying numbers of moles of ethylene oxide to produce ethoxylated dodecyl phenols of different degrees of ethoxylation. The ethoxylated dodecyl phenols were then reacted with hydroxyethylene sodium sulfonate to produce a sodium salt of a dodecylbenzenepolyethoxyethylene sulfonate. The sodium dodecylbenzenepolyethoxyethylene sulfonate reaction products may be identified by the following formula:

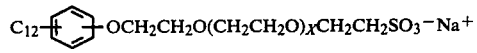

where X is 0, 1, 2, 3, ..., and the term (X+1)-mer denotes a surfactant where the average number of ethylene oxide units in the molecule is (X+1).

The mole percent of an individual (X+1)-mer is calculated by the following formula:

$$\text{mole \% } (X+1)\text{-mer} = e^{-M} M^X / X! (100)$$

where $e = 2.71828$, M = (number of moles of ethylene oxide reacting per mole of dodecylphenol, minus one) and X is an integer (0,1,2, ...). When $X=0$, $e^{-M} M^X/X! = e^{-M}$. The distinction between M and X must be kept clearly in mind. The term M refers to a mole ratio and may include integers or fractional numbers whereas X and (X+1) must be integers.

This equation was used to calculate the distribution for sulfonated, ethoxylated dodecylphenol. The calculated distribution for adduct S3 (a sulfonated 3 mole ethylene oxide adduct of dodecylphenol), as well as adduct S4, S5 and S6 are shown in Table I below.

TABLE I
DISTRIBUTION OF COMPONENTS IN SULFONATED ETHOXYLATED DODECYLPHENOL

| Value of n IN $C_{12}$—$(EO)_n$—$SO_3Na$ | Mole FRACTION | | | |
|---|---|---|---|---|
| | S3 | S4 | S5 | S6 |
| 2 | 0.368 | 0.135 | 0.050 | 0.018 |
| 3 | 0.367 | 0.271 | 0.149 | 0.073 |
| 4 | 0.184 | 0.271 | 0.224 | 0.147 |
| 5 | 0.061 | 0.180 | 0.224 | 0.195 |
| 6 | 0.015 | 0.090 | 0.168 | 0.195 |
| 7 | 0.003 | 0.036 | 0.101 | 0.156 |
| 8 | 0.001 | 0.012 | 0.050 | 0.104 |
| 9 | 0.000 | 0.003 | 0.022 | 0.060 |
| 10 | 0.000 | 0.001 | 0.008 | 0.030 |

A plurality of blends of the dodecylbenzenepolyethoxyethylene sulfonate were formulated having the same average number of ethoxy units per molecule, but differing in the range of ethoxylation and distribution of ethoxylation of various species present in a mixture. This will be illustrated below.

Four products were made, identified as S3, which is the sulfonated reaction product of a 3 mole ethylene oxide adduct of dodecylphenol; S4, which is a sulfonated 4 mole ethylene oxide adduct of dodecylphenol; as well as S5 and S6 which are sulfonated 5 and 6 mole (respectively) ethylene oxide adducts of dodecylphenol. Various blends of these reaction products were also made, and the mole fraction and weight fraction of different species of varying degrees of ethoxylation were calculated using the above formula. The distribution of the S4 adduct as well as the distribution of 3 blends of S3, S4, S5 and S6, all blends being formulated so the average of ethoxylation is 4, are given in Table II below:

TABLE II
DISTRIBUTION OF COMPONENTS IN DODECYLBENZENEPOLYETHOXYETHYLENE SULFONATE BLENDS

REACTION PRODUCTS AND BLENDS

| VALUE OF n IN $C_{12}$—$(EO)_n$—$SO_3$ | A S4 | | B 1 S3 1 S4 1 S5 | | C 1 S3 1 S5 | | D 1 S3 1 S6 | |
|---|---|---|---|---|---|---|---|---|
| | MOLE FRACTION | WT. FRACTION | MOLE FRACTION | WT. FRACTION | MOLE FRACTION | WT. FRACTION | MOLE FRACTION | WT. FRACTION |
| 2 | 0.135 | 0.112 | 0.184 | 0.153 | 0.209 | 0.174 | 0.251 | 0.209 |
| 3 | 0.271 | 0.248 | 0.262 | 0.240 | 0.258 | 0.237 | 0.269 | 0.247 |

TABLE II-continued

DISTRIBUTION OF COMPONENTS IN
DODECYLBENZENEPOLYETHOXYETHYLENE SULFONATE BLENDS

REACTION PRODUCTS AND BLENDS

| VALUE OF n IN $C_{12}$—$(EO)_n$—$SO_3$ | A S4 MOLE FRACTION | A S4 WT. FRACTION | B 1 S3 1 S4 1 S5 MOLE FRACTION | B 1 S3 1 S4 1 S5 WT. FRACTION | C 1 S3 1 S5 MOLE FRACTION | C 1 S3 1 S5 WT. FRACTION | D 1 S3 1 S6 MOLE FRACTION | D 1 S3 1 S6 WT. FRACTION |
|---|---|---|---|---|---|---|---|---|
| 4 | 0.271 | 0.271 | 0.226 | 0.226 | 0.204 | 0.204 | 0.172 | 0.172 |
| 5 | 0.180 | 0.195 | 0.155 | 0.168 | 0.143 | 0.155 | 0.106 | 0.115 |
| 6 | 0.090 | 0.105 | 0.091 | 0.106 | 0.092 | 0.107 | 0.075 | 0.088 |
| 7 | 0.036 | 0.045 | 0.047 | 0.059 | 0.052 | 0.065 | 0.054 | 0.068 |
| 8 | 0.012 | 0.016 | 0.021 | 0.028 | 0.026 | 0.035 | 0.035 | 0.047 |
| 9 | 0.003 | 0.004 | 0.008 | 0.011 | 0.011 | 0.016 | 0.020 | 0.028 |
| 10 | 0.001 | 0.002 | 0.003 | 0.005 | 0.004 | 0.006 | 0.010 | 0.015 |

It can be seen from the data in Table II above that the values for mole fraction and weight fraction of S4, the data contained in Column A, illustrate the mole fraction and weight fraction distribution of molecular components of the mixture whose ethoxylation varies from 2 to 10. For example, the mole fraction of dodecylbenzene polyethoxyethylene sulfonate having two ethoxy groups per molecule of S4 is 0.135, and the mole fraction of S4 having 3 moles of ethylene oxide per mole of surfactant is 0.271, etc. Thus it can be seen that surfactant S4, while being prepared from a species having an average of 4 moles of ethylene oxide per mole of surfactant, includes some components with as few as 2 moles and small amounts of components with as many as 10 moles ethylene oxide per mole of surfactant. Thus even surfactant S4 represents a mixture of components of varying degrees of ethoxylation, but it is not a mixture having distribution of components which is sufficiently broad or sufficiently even to meet the criteria which I have found defines the preferred surfactant. Thus most of the species of S4 have either 3 or 4 moles of ethylene oxide per mole of surfactant, with much smaller amounts of 2 and 5 and only very small amounts of 6–10 moles of ethylene oxide.

Column B represents a blend of equal amounts of S3, S4 and S5. It can be seen that this blend, although having an average degree of ethoxylation equal to S4, represents a broader spectrum of species insofar as the degree of ethoxylation is concerned. Thus the mole fraction of dipolyethoxylated fractions (n=2) is 0.18 for the blend illustrated in column B, compared to 0.135 for S4 itself.

Column C contains the distribution of components of a blend of equal amounts of S3 and S5. While the average degree of ethoxylation of this blend is four, the same as the preceeding blends, the distribution is somewhat improved on the low ethoxylation end of the spectrum, as the mole fraction of dipolyethoxylated species is 0.209 compared to 0.184 for the blend whose data are contained in column B and higher than the mole fraction in S3 itself. The mole fraction of species having 6 units of ethylene oxide is about the same as blend B, but it can be seen that for 7 units of ethylene oxide, the distribution is somewhat better than blend B.

Column 6 represents the component distribution for a blend comprising two moles of S3 and one mole of S6.

The test parameters for the particular field being studied indicated that the preferred surfactant for purposes of oil recovery effectiveness was one having an average of 4 moles of ethylene oxide per mole of dodecylbenzenepolyethoxy sulfonate. One method for determining the relative effectiveness of different candidates in surfactant flooding is to formulate surfactant fluids in the brine having salinity about the same as the oil field brine in the formation in which the fluid is to be injected, and observe the fluid to determine whether it is stable or exhibits phase separation. A surfactant fluid containing 1.0 percent by weight (10 kg per m$^3$) surfactant was prepared using product S4, the product obtained by reacting a 3 mole ethylene oxide adduct of dodecylphenol with hydroxyethyl sodium sulfonate. The fluid separated into two phases, indicating that this surfactant fluid would not be a suitable candidate for the surfactant waterflood oil recovery process. Otherwise similar solutions using blends B, C and D, as described above, exhibited little or no phase separation in the same salinity environment. Thus based on phase stability alone, it was observed that any of the blends having an average of 4 moles of ethylene oxide per mole of surfactant were superior to the narrower component distribution species identified in Column A of Table II as S4, because the superior performing blends all have improved distribution of ethoxylation.

A series of laboratory core floods were performed to measure directly the relative effectiveness of the different surfactant fluids described above for recovering oil from cores. The first series of tests were performed in a Berea sandstone core and the second series were performed in a Dolomite limestone core. In all of the tests, the cores were first saturated with an oil field brine (brine having salinity of 87,000 parts per million total dissolved solids or 87 kg/m$^3$ total dissolved solids including 25 kg/m$^3$ total hardness expressed as calcium carbonate.) The pH of the brine was in the range from 6.0 to 6.5. All of the cores were 5.08 centimeters in diameter and 13 to 20 centimeters in length. The cores were then resaturated with crude oil obtained from a formation being studied (which oil had been thinned to reservoir viscosity (2 mPa.s) with heptane) to establish an oil saturation of about 65 percent, which is comparable to the oil saturation present in the formation prior to waterflooding. The cores were then flooded with oil field brine at a relatively slow rate (1.5 m per day or 5 feet per day) until the oil saturation reached an irreducible level, identified in the table as $S_{oWF}$. An aqueous fluid containing 1% (10 kg/m$^3$) surfactant solution was then injected to displace oil until there was no further oil production from the core, which except in one test, required from 2 to 3 pore volume of surfactant solution.

The data obtained in these runs are contained in Table III.

TABLE III
TERTIARY OIL RECOVERY
REACTION PRODUCTS

| | A<br>S4 | B<br>1 S3<br>1 S4<br>1 S5 | C<br>1 S3<br>1 S5 | D<br>2 S3<br>1 S6 |
|---|---|---|---|---|
| BEREA CORE | | | | |
| $So_{WF}$, m³/m³ | 0.339 | 0.282 | 0.339 | 0.276 |
| $So_{ChF}$, m³/m³ | 0.159 | (0.167)* | 0.103 | 0.176 |
| $\Delta So$, m³/m³ | 0.180 | | 0.236 | 0.100 |
| $E_r$, m³/m³ | 0.532 | (0.41)* | 0.693 | 0.368 |
| DOLOMITE CORE | | | | |
| $So_{WF}$ | 0.279 | | 0.351 | |
| $So_{ChF}$ | 0.197 | | 0.186 | |
| $\Delta So$ | 0.082 | | 0.165 | |
| $E_R$ | 0.293 | | 0.468 | |

*Core still producing oil when test was terminated.

It can be seen from the data above that the enhanced recovery, $E_R$, was 0.53 (53%) for flood A, 0.41 for (incomplete) flood B, 0.693 for flood C and 0.368 for flood D. The test for which the value for $E_R$ reported for flood B differed from the others in that oil production had not completely stopped at the time the test was terminated, although substantial amounts of surfactant fluid had been injected. The values are believed to be comparable, however.

It can be seen by examining the above data that although all of the surfactants employed in these oil displacement tests had the same average degree of ethoxylation, specifically 4.0, the oil recovery effectiveness under these test conditions was substantially different. Specifically, blend C produced substantially better oil recovery than was reported in column A employing surfactant S4. This clearly establishes the advantage of having a broad even range of degree of ethoxylation of the ethoxylated and sulfonated surfactant. Blend D, which had a broad range but not an even range of distribution, achieved less satisfactory enhanced oil recovery effectiveness than any of the other runs. This clearly indicates that not only should the surfactant comprise a broad spectrum of species differing in the degree of ethoxylation, but additionally they should contain components within the specified percentage ranges. The weight fraction of molecular species having degree of ethyoxylation of 2 thru 10 for Sample A in Table II clearly indicates that, while a single species will include molecules of different degrees of ethoxylation present, it will not have either the breath or evenness in the range of degree of ethoxylation which I have found to provide superior results. Tabulated below in Table IV are the weight percent ranges of my invention as well as the calculated range percent for each of the distribution cuts for sample A and blend C.

TABLE IV

| | Preferred Content | Sample A | Sample C |
|---|---|---|---|
| <n − 1 | 15–19 | 13.5 | 17.4 |
| n − 1 | 16–24 | 27.1 | 23.7 |
| n | 18–24 | 27.1 | 20.4 |
| n + 1 | 12–17 | 18 | 15.5 |
| >n + 1 | 18–24 | 14 | 22.9 |

It can be seen from the above table that the weight percent of sample A having degree of ethoxylation less than n−1 and equal to n+1 are within the range of my invention, the weight percent for n−1, n and greater than n+1 are not within the range. Moreover, as can be seen in the oil recovery results reported in Table III, the final tertiary oil recovery obtained using sample A was 53% versus 69% for sample C, a product which is within the scope of the preferred range. The additional 16% of the original oil obtained, which is a thirty percent increase in tertiary oil recovery obtained using an otherwise identical surfactant waterflood, is a surprising result of using a surfactant having a broader and more even range in the degree of ethoxylation of the ethoxylated and sulfonated surfactant employed.

Another set of tests were conducted in the Dolomite Core using only blend C and surfactant S4. The same pattern is observed, with blend C obtaining significantly greater enhanced oil recovery than the run using S4. This clearly shows the superiority of an oil recovery process employing the surfactant described herein having broad, even distribution of degrees of ethoxylation.

Thus I have disclosed and demonstrated in laboratory tests, that the amount of oil recovered in a surfactant waterflood oil recovery process employing a fluid containing an alkyl or alkylarylpolyethoxy sulfate or alkyl or alkylarylpolyethoxyalkylene sulfonate surfactant in combination with petroleum sulfonate, is improved significantly if the ethoxylated and sulfated or ethoxylated and sulfonated surfactant is comprised of a large number of molecular species of differing degree of ethoxylation, and that the distribution of the species is relatively even over the broad range of species present.

While my invention has been described in terms of a number of illustrative embodiments, it is clearly not so limited since many variations thereof will be apparent to persons skilled in the art of enhanced oil recovery surfactant waterflooding processes without departing from the true spirit and scope of my invention. It is my intention and desire that my invention be limited and restricted only by those claims appearing immediately hereinafter below.

I claim:

1. A method for recovering petroleum from a subterranean, petroleum-containing formation, said formation being penetrated by an injection well and a spaced-apart producing well containing water having salinity greater than 20,000 parts per million total dissolved solids, comprising injecting into the formation via the injection well an aqueous saline surfactant fluid containing from 0.1 to 10.0 percent by weight of an alkoxylated and sulfonated surfactant having the following formula:

$$RO(R'O)_nR'SO_3^-X^+$$

wherein R is an alkylaryl group having from 6 to 20 carbon atoms in the alkyl chain, R' is ethylene or a mixture of ethylene and higher alkylene with relatively more ethylene than higher alkylene, n is an integer closest numerically to the average degree of alkoxylation at which the surfactant is effective for oil recovery at the formation water salinity, R' is ethylene, propylene, hydroxy propylene or butylene, S is sulfur, O is oxygen, and X is a monovalent cation, wherein the alkoxylated and sulfonated surfactant is prepared by blending together at least two reaction products of different average degrees of alkoxylation, said reaction products each being comprised of molecular species of varying degrees of alkoxylation, the reaction products being blended in a predetermined ratio to produce a mixture of molecular species differing in the degree of alkoxylation and containing molecules having degrees of alkoxylation ranging from less than $n-2$ to $n+10$, wherein from 14 to 20 weight percent of the molecules have degrees of alkoxylation less than $n-1$, from 16 to 25 weight percent have degree of alkoxylation equal to $n-1$; from 16 to 25 weight percent of the molecules have degree of alkoxylation equal to n; from 12 to 17 percent have degree of alkoxylation equal to $n+1$; and from 15 to 25 percent have degree of alkoxylation greater than $n+1$, said surfactant fluid displacing petroleum through the formation, and recovering the petroleum displaced by the surfactant solution from the formation via the producing well.

2. A method as recited in claim 1 wherein R is an alkylaryl group comprising benzene, toluene or xylene having attached thereto at least one alkyl group having from 9 to 15 carbon atoms.

3. A method as recited in claim 1 wherein the surfactant is a blend of species of different degrees of alkoxylation ranging from $n-2$ to $n+4$.

4. A method as recited in claim 1 wherein from 15 to 19 percent by weight of the molecules have degrees of alkoxylation less than $n-1$.

5. A method as recited in claim 1 whereas from 16 to 24 percent of the surfactant species have degree of alkoxylation equal to $n-1$.

6. A method as recited in claim 1 wherein from 18 to 24 percent of the surfactant species have degree of alkoxylation equal to n.

7. A method as recited in claim 1 wherein from 14 to 16 percent of the molecules have degree of alkoxylation equal to $n+1$.

8. A method as recited in claim 1 wherein from 18 to 24 percent of the molecules have degrees of alkoxylation greater than $n+1$.

9. A method as recited in claim 1 wherein the alkoxylated and sulfonated surfactant is substantially the only surfactant present in the surfactant fluid.

10. A method as recited in claim 9 wherein the concentration of the alkoxylated and sulfonated surfactant is from 0.5 to 5.0 percent by weight.

11. A method as recited in claim 1 wherein the surfactant fluid contains, in addition to the alkoxylated and sulfonated surfactant, from 1.0 to 15.0 percent by weight of petroleum sulfonate.

12. A method as recited in claim 11 wherein the concentration of petroleum sulfonate is from 2.0 to 10.0 percent by weight.

13. A method as recited in claim 11 wherein the concentration of the alkoxylated and sulfonated surfactant is from 2.0 to 8.0 percent by weight.

14. A method as recited in claim 11 wherein the concentration of the alkoxylated and sulfonated surfactant is from 0.20 to 4.0 percent by weight.

15. A method as recited in claim 1 wherein the surfactant is an ethoxylated and sulfonated surfactant in which R' is ethylene.

* * * * *

UNITED STATES PATENT AND TRADEMARK OFFICE
CERTIFICATE OF CORRECTION

PATENT NO. : 4,460,481
DATED : July 17, 1984
INVENTOR(S) : Vernon H. Schievelbein It is certified that error appears in the above-identified patent and that said Letters Patent is hereby corrected as shown below:

Claim 13, line 3, "2.0 to 8.0" should read

-- 0.20 to 8.0 --.

Signed and Sealed this

Second Day of July 1985

[SEAL]

Attest:

DONALD J. QUIGG

Attesting Officer        Acting Commissioner of Patents and Trademarks